United States Patent [19]

Ishii et al.

[11] Patent Number: 4,635,457
[45] Date of Patent: Jan. 13, 1987

[54] METHOD OF WINDING DOUBLE-LAYER MOTOR COILS

[75] Inventors: Takayuki Ishii; Yuji Yamauchi, both of Chiba, Japan

[73] Assignee: Sony Corporation, Tokyo, Japan

[21] Appl. No.: 786,076

[22] Filed: Oct. 10, 1985

[30] Foreign Application Priority Data

Oct. 25, 1984 [JP] Japan ................... 59-225474

[51] Int. Cl.⁴ .............. B21D 11/00; B21C 47/10; H01F 7/06; H01F 11/04
[52] U.S. Cl. ..................... 72/66; 29/605; 72/148; 72/371; 140/92.2; 242/7.03; 242/7.11
[58] Field of Search ............... 29/605; 72/66, 142, 72/148, 371; 140/92.1, 92.2; 242/7.03, 7.06, 7.09, 7.13, 7.14, 7.15

[56] References Cited
U.S. PATENT DOCUMENTS 2,595,332  5/1952  Chapman et al. ............... 242/7.13
3,801,029  4/1974  Malburg .......................... 242/7.03
4,449,291  5/1984  Rothman ......................... 29/605

Primary Examiner—E. Michael Combs
Attorney, Agent, or Firm—Eslinger, Lewis H.; Alvin Sinderbrand

[57] ABSTRACT

A double-layer coil for an electric motor is formed of a single continuous conductor with the two layers being wound simultaneously. A first length of conductor is wound about a pulley to form a coil and at the end of that coil but without breaking the conductor another coil is commenced to be wound about a rotating bobbin, with the coil of the first length wound on the pulley being caused to orbit the bobbin at a rate twice the bobbin rotation speed, whereby the conductor coil is unwound from the pulley and rewound on the bobbin at and the same time a further conductor is being wound about the bobbin to form a second coil, thereby forming both layers of the coil simultaneously.

8 Claims, 24 Drawing Figures

FIG.6
FIG.7
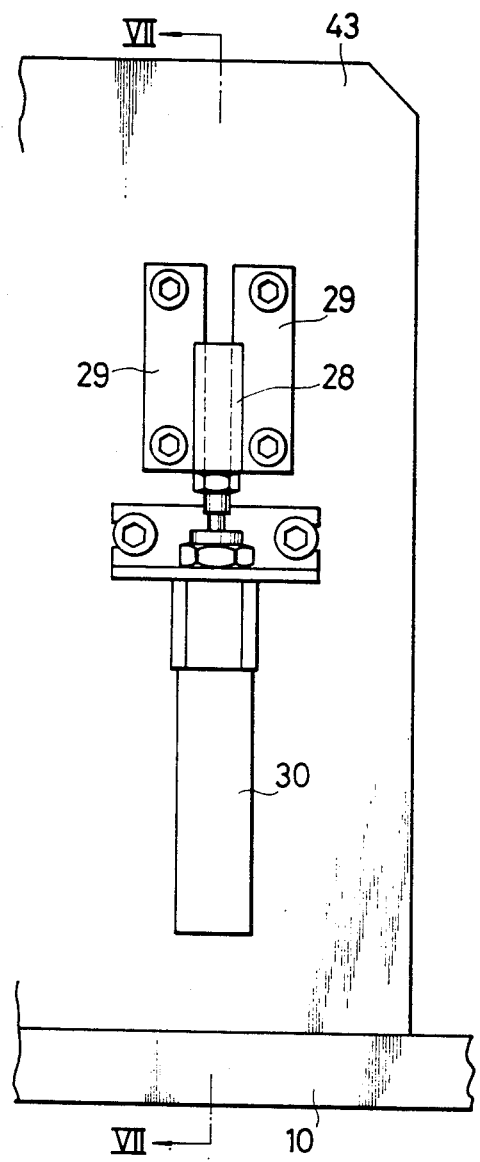
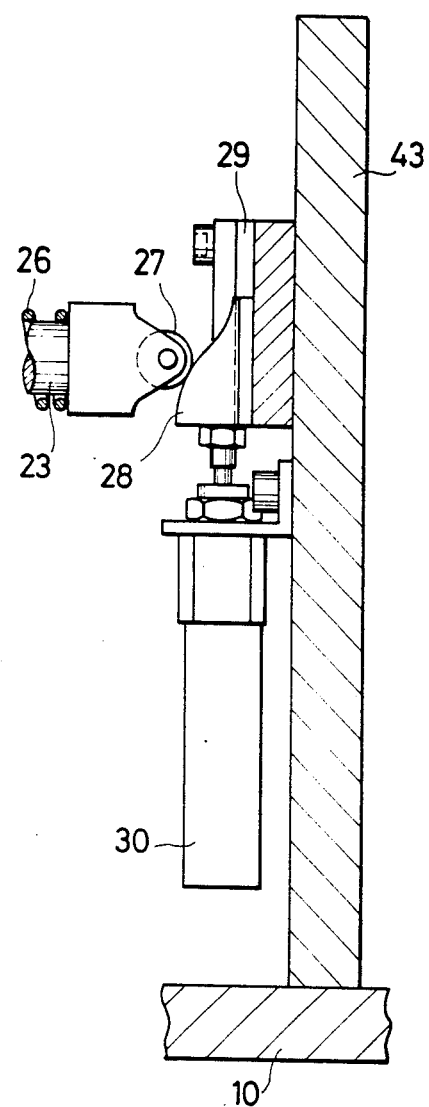

METHOD OF WINDING DOUBLE-LAYER MOTOR COILS

BACKGROUND OF THE INVENTION

1. Field of the Invention

The present invention relates generally to coils for electric motors and, more particularly, to a method and apparatus for winding a double-layer coil, in which each layer of the coil is wound at the same time.

2. Description of the Background

Flat, brushless DC motors particularly adapted for small portable electronic equipment are now well known in the art. Such flat, brushless DC motors are generally provided with permanent magnet pole pieces, which are secured to the rotor that cooperate with oppositely arranged energizable coils mounted on the stator. Rotational torque to cause the rotor to rotate relative to the stator is produced by the interaction of magnetic flux generated by the permanent magnetic pole pieces and the field caused by electrical current flowing through the coils. Generally, the direction of rotation is perpendicular to the direction of magnetic flux and to the direction of current flow through the coils. In order to produce sufficient rotational torque for general use, each coil is typically formed of a plurality of layers in order to increase the magnetic flux generated by the current flowing therethrough. Now that subminiature motors are required for the small portable electronic equipment presently in use, it is necessary to reduce the total size of the motor used in such portable equipment with concomitant reductions in the thickness and diameter of each coil. This is typically achieved by reducing the number of Layers of the coil, as well as reducing the number of turns in each layer.

In accordance with meeting this size limitation, it is known to provide a double-layer coil in which each layer is formed separately, with the inner ends of the two individual coils then being soldered together. Additionally, in forming such double-layer coil it is also known to utilize rectangular cross-section conductors, in place of the more typical circular cross-section magnet wire, in order to increase field strength.

Typical of coils known heretofore for use in miniature applications are the multi-layer coil described in U.S. Pat. No. 4,496,927 and the multi-layer electric coil utilizing a flat conductor described in British Pat. No. 1,285,646.

Now, even though multi-layer coils are known to be formed as individual coils, the coils must be individually soldered together or mechanically clamped together, and the processes to accomplish this series connection of the individual layers of the coils involve additional manufacturing steps and, more importantly, typically involve soldering, which must be closely monitored in time and temperature to prevent degradation of the coils following this soldering process.

OBJECTS AND SUMMARY OF THE INVENTION

Accordingly, it is an object of the present invention to provide a method and apparatus for forming double-layer coils for use in electric motors that can eliminate the above-noted defects inherent in the prior art.

It is another object of the present invention to provide a method and apparatus for winding double-layer motor coils in which each layer of the coil is wound simultaneously.

It is a further object of the present invention to provide a method and apparatus for winding a double-layer motor coil in which the coils are wound at the same time and the method is easy to perform and economies of manufacture are obtained.

In accordance with an aspect of the present invention, a method for winding a double-layer electric motor coil includes winding a length of electrical conductor around a pulley or sheave sufficient to form one layer of a double-layer coil and then rotating a bobbin in a selected direction at a certain revolutions per minute in order to wind a conductor, which is a further continuous length of the conductor that was wrapped around the pulley, around the bobbin and at the same time revolving the pulley around the bobbin in the same direction but at twice the initially determined revolutions per minute, thereby to unwind the conductor from the pulley and rewind it around the bobbin to form the second layer of the coil. In this way, both the first and second layers of the coil are formed simultaneously about the bobbin and no electrical connection between individual layers of the dual-layer coil is required.

In accordance with another aspect of the invention, apparatus is provided to wind a double-layer electric motor coil that includes a flyer member that is arranged to revolve about a rotating inner bobbin member. A pulley or sheave is rotatably mounted on the flyer member and has a selected length of conductor wound thereon such that when the bobbin is rotated at a first revolution per minute the flyer member revolves at twice that rate and is caused to orbit the bobbin so that on the one hand the conductor is continuously fed from the input to wind a first layer of the coil on the bobbin and on the other hand the conductor length that was earlier wound onto the pulley is then unwound therefrom and wound about the bobbin adjacent the first layer, whereby both layers of the coil are wound on the bobbin simultaneously.

The above and other objects, features, and advantages of the present invention will become apparent from the following detailed description of illustrative embodiments thereof, which is to be read in conjunction with the accompanying drawings, in which like reference numerals indicate like parts and elements

BRIEF DESCRIPTION OF THE DRAWINGS

FIG. 6 is a side elevational view showing the moving cam member employed in the embodiment of FIG. 2 in more detail;

FIG. 7 is a cross-sectional view taken along section line VII—VII of FIG. 6;

DETAILED DESCRIPTION OF THE PREFERRED EMBODIMENTS

Figure 1:
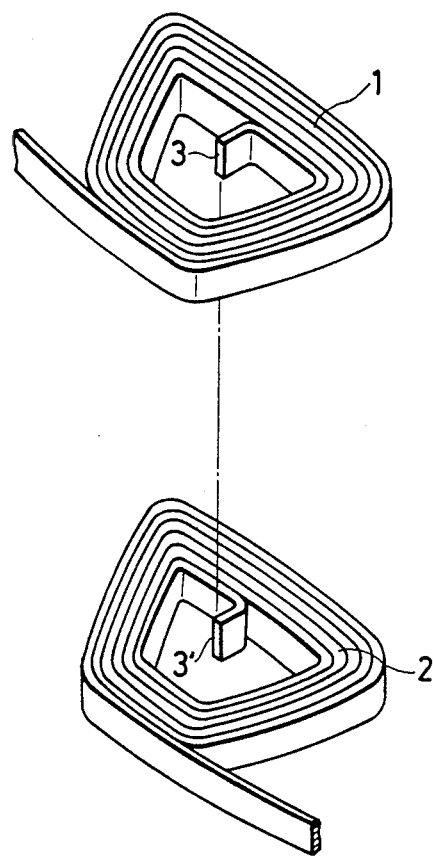
FIG. 1 is an exploded perspective view of a double-layer coil known in the prior art.

FIG. 1 represents a double-layer coil for use in electric motors utilizes rectangular cross-sectional conductors that has been made in accordance with a presently known method. More specifically, FIG. 1 shows the double-layer coil partially exploded, in which a first winding coil 1 is provided along with a separate, second winding coil 2. The inner ends 3,3' of the rectangular cross section conductors of windings 1 and 2, respectively, are electrically connected typically by a soldering process. As pointed out above, the soldering process is troublesome due to the requirement to closely monitor the temperature, pressure, and the length of time at which the heat is applied in order to preclude the degradation of the assembled coils.

Figure 2:
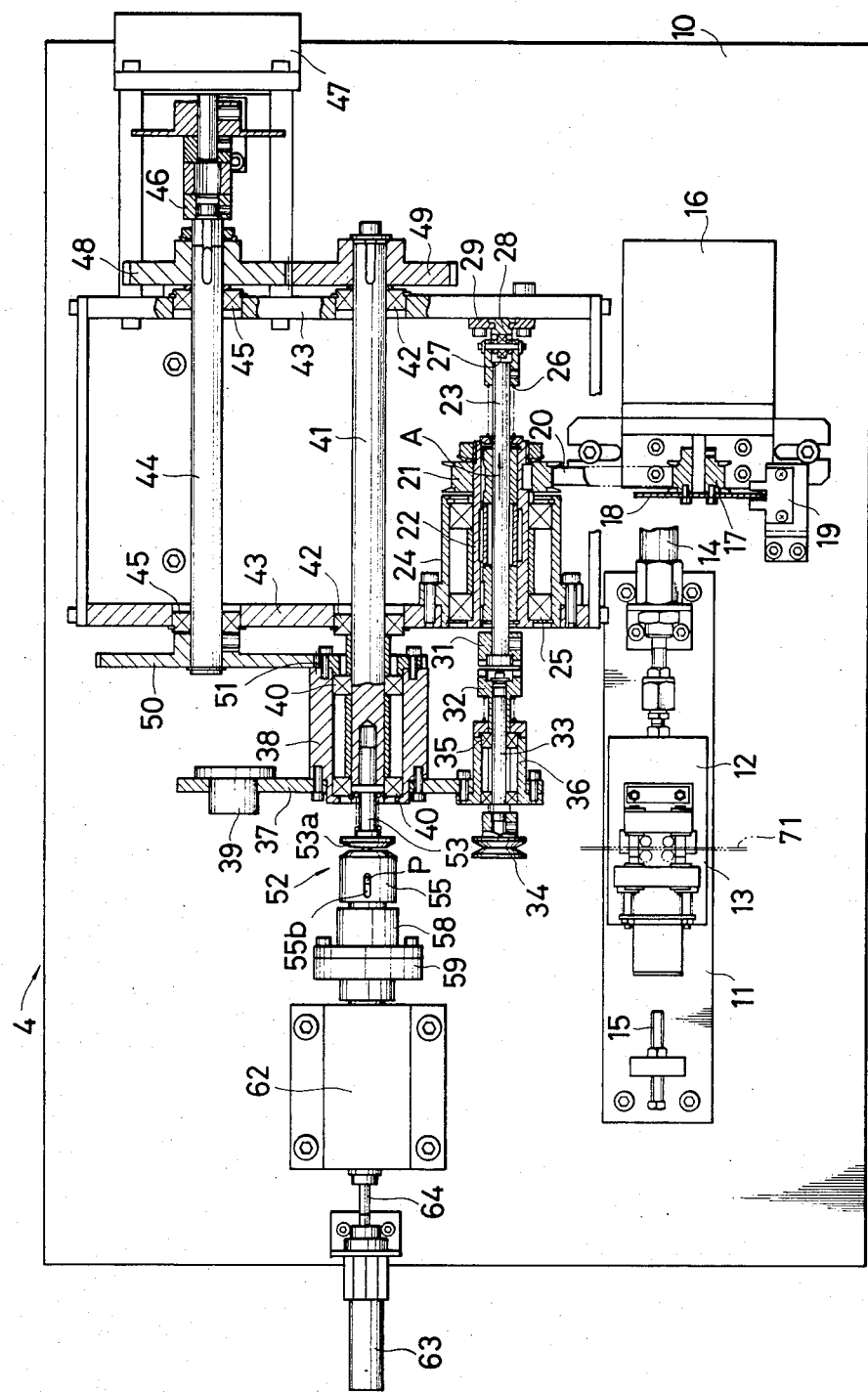
FIG. 2 is an top plan view, in partial cross section, of an embodiment of the coil forming apparatus according to the present invention.

FIG. 2 shows an apparatus according to an embodiment of the present invention to wind a double-layer coil with both layers being wound simultaneously, thereby obviating the necessity to join two individually prepared layers to form the double-layer coil. The apparatus is mounted on a chassis 10, with a subchassis 11 mounted thereon that supports a guide assembly 13 that operates to correctly feed a conductor wire 71, having a rectangular cross-section. It is conductor 71 that is used to form the double-layer coil.

Figure 3:
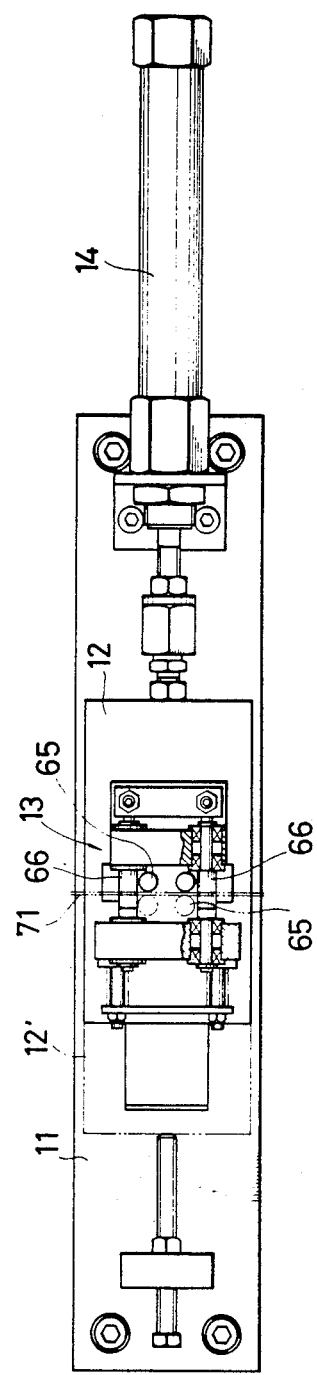
FIG. 3 is a top plan view, in partial cross section, showing a portion of the apparatus of FIG. 2 in more detail.
Figure 4:
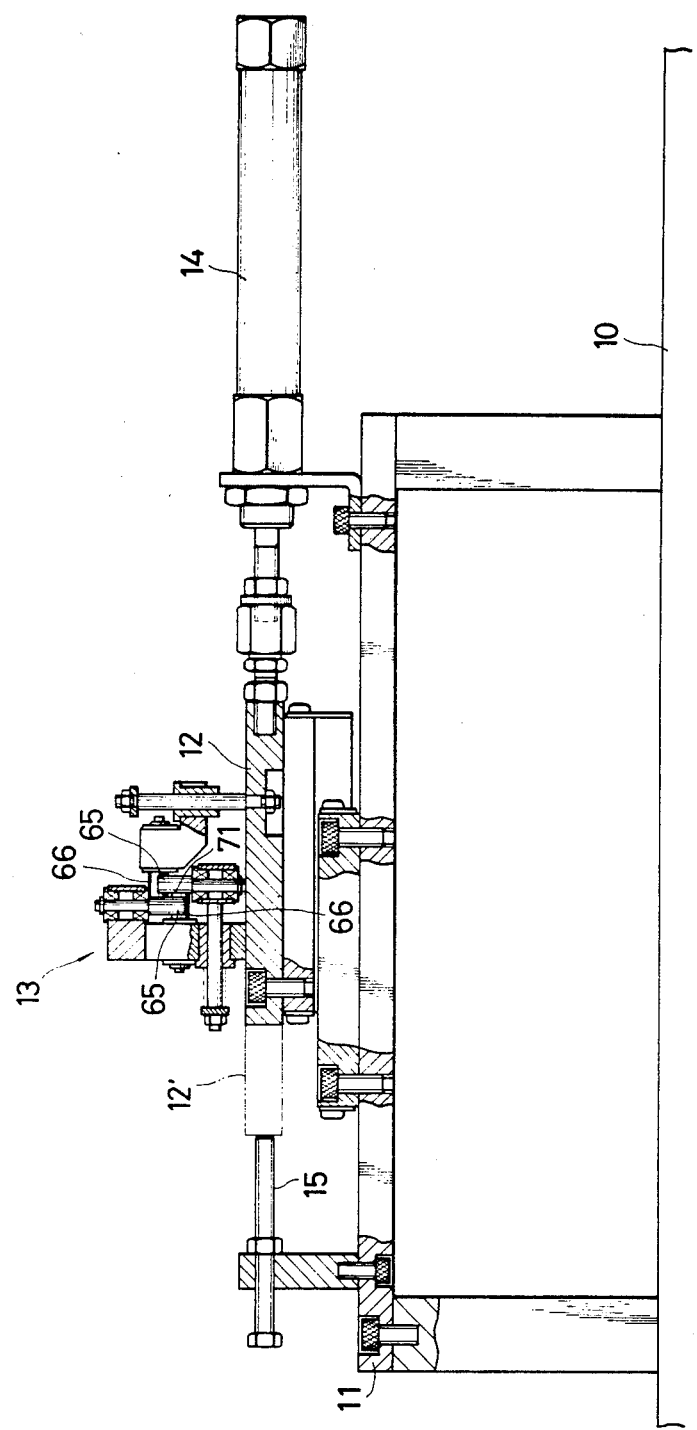
FIG. 4 is a front elevational view, in partial cross section, of the portion of the apparatus of FIG. 3.
Figure 5:
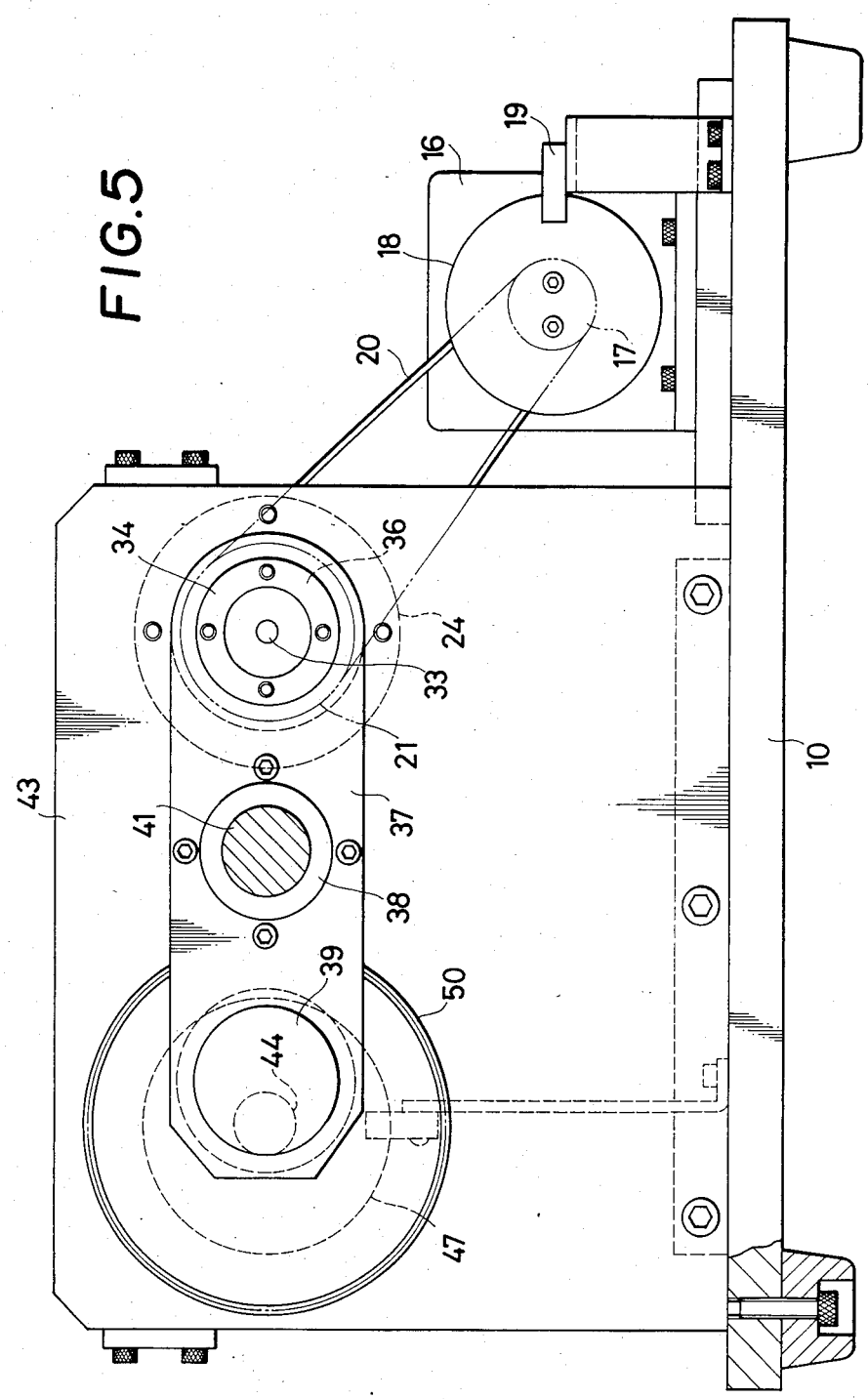
Fig. 5 is a side elevational view showing a portion of the apparatus of FIG. 2 in more detail.

FIGS. 3 and 4 show guide assembly 13 in more detail in which it is seen that a table 12 is movably mounted on subchassis 11, with movement thereof being provided by operation of a hydraulic or pneumatic cylinder 14. By actuation of the driving rod or piston rod of cylinder 14, moving table 12 is horizontally slid along subchassis 11 from its position 12 shown in solid lines at FIGS. 3 and 4 to a left-most shown in the two dot chain line at 12' of FIGS. 3 and 4. A stop to limit the extent of travel of movable table 12 is provided by a bolt 15 affirmly affixed to subchassis 11.

The conductor that is used to form the actual coil is a rectangular cross-sectional conductive wire 71 that is fed between two sets of vertically arranged rollers 65 and two sets of horizontally arranged rollers 66. In this way, conductor 71 accurately guided and controlled by assembly 13

Referring back to FIG. 2, a motor 16 of the kind typically used in forming coils is utilized in this embodiment of the present invention and is mounted on chassis 10. Affixed to the drive shaft of motor 16 are a pulley or sheave 17 and a sensing disc 18. A sensor 19 is affixed to chassis 10 and cooperates with disc 18 to determine the rotational rate of the drive shaft of motor 16 and, thus, the revolutions per minute of the pulley 17.

FIG. 3 shows this assembly in more detail from a side elevational view, in which it is seen that an endless belt 20 is operably connected between pulley 17 and a second pulley 21, which is connected to a drive shaft. FIG. 2 shows drive shaft 23, which is mounted in a rotary sleeve 22. Rotary sleeve 22 is rotatably supported by bearing elements 25 that permit shaft 22 to move in a horizontal or lateral direction as well as to rotate. As shown in FIG. 2, a coil spring 26 is arranged around shaft 23 to urge shaft 23 to move in the direction shown by arrow A in FIG. 2, whereby a roller element 27 rotatably attached to the end of shaft 23 will be in contact with a curved surface forming a cam member 28, as shown in detail in FIGS. 6 and 7.

In FIGS. 6 and 7, cam member 28 is slidably mounted for vertical movement on a pair of rails 29, which are firmly affixed to a frame element 43 mounted on chassis 10. Movement is imparted to cam member 28 by the piston of a hydraulic or pneumatic cylinder 30, whereby upon movement of cam member 28 cam follower or roller 27 will cause shaft 23 to change its position in the horizontal direction, as seen in FIGS. 2 and 7. Driving cam 28 upward will move shaft 23 to the left, in the opposite direction as arrow A, this compresses spring 26 and also brings into engagement elements 31 and 32 that form a clutch assembly. More specifically, as shown in FIG. 2 clutch member 31 is affixed to the end of shaft 23 opposite cam-follower roller 27 and is formed for engagement with coupler 32, which is affixed to an end of rotary shaft 33. Thus, by operation of cylinder 30 and spring 26 elements 31 and 32 can be made to engage and disengage.

Shaft 33 is mounted for rotation by means of bearing 34 arranged in a rotary bracket 36 and at the end opposite clutch coupling 32 has affixed thereto a pulley or sheave 34. Pulley 34 is provided to have wound thereon a predetermined length of conductor wire 71 that will ultimately become one of the layers of the finished coil. Rotary bracket 36 is bolted or firmly affixed to a flyer arm 37 having a counter weight or counter balance 39 symmetrically arranged on flyer arm 37 relative to rotary bracket 36. Flyer arm 37 is mounted to rotary bracket 38 at its center, and rotary bracket 38 is rotatably supported on main shaft 41 by a bearing pair 40. Main shaft 41 is in turn mounted for rotation by means of a bearing pair 42, which are mounted in frame elements 43 that are affixed to chassis 10.

A powered drive shaft 44 is also rotatably mounted on frame elements 43 by means of another bearing pair 45 and is arranged substantially parallel to main shaft 41. Drive shaft 44 has mounted on one end a coupler or connector ring 46 that is connected to the drive shaft of main drive motor 47 and adjacent connector ring 46 is mounted a first drive gear 48, which is pinned or keyed to drive shaft 44 and arranged to engage gear 49 that is similarly pinned or keyed to the corresponding end of main shaft 41. The number of teeth in gears 48 and 49 is the same, thereby providing a gear ratio of 1:1, so that drive shaft 44 and main shaft 41 rotate at the same number of revolutions per minute, although in opposite directions. Affixed to the other end of drive shaft 44 is a drive gear 50 that engages a toothed gear element 51 bolted to one end of rotary bracket 38. Rotary bracket 38 is rotatably mounted on main shaft 41 by means of bearing pair 40. The number of gear teeth in second drive gear 50 is two times the number of gear teeth in the toothed gear element 51, so that a gear ratio of 2:1 is provided therebetween. By means of this 2:1 gear ratio the number of revolutions per minute of rotary bracket 38 is twice that of main shaft 41. Because flyer arm 37 is bolted to the end of rotary bracket 38 opposite that of toothed element 51, flyer arm 37 will also rotate at a rate of revolutions per minute twice that of main shaft 41.

Figure 8:
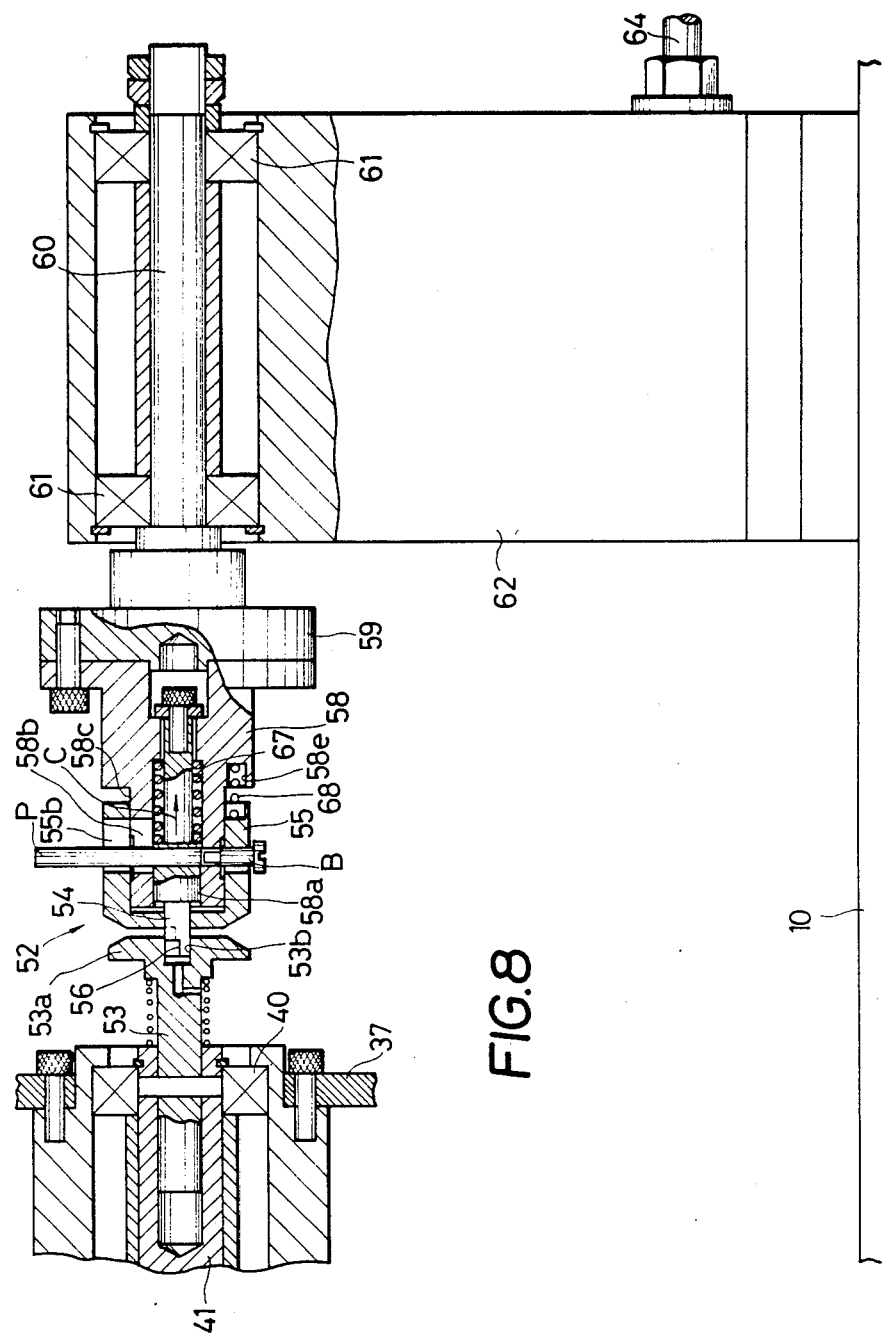
FIG. 8 is a rear elevational view, in partial cross section, showing the bobbin of the embodiment of FIG. 2 in more detail.

The specific construction of the bobbin assembly arranged at the end of main shaft 41 opposite drive gear 49 is shown in FIG. 8, which is a rear elevational view in partial cross section of the bobbin assembly 52 of FIG. 2 looking in from the rear of the apparatus, that is, from the side opposite subchassis 11, so as not to have sheave 34 and conductor guide assembly 13 in the view. Turning then to FIG. 8, bobbin assembly 52 comprises a flange member 53 that extends from the end of main shaft 41 at which flyer arm 37 is affixed. Bobbin assembly 52 also includes a bobbin spindle or bobbin shaft 54 and a bobbin spindle holder element 55, which is arranged around the bobbin spindle 54 and opposes flange element 53. More specifically, bobbin spindle 54 is formed to be inserted into an inner bore 58a of rotary sleeve 58 and is free to slide into and out of bore 58a. Specifically, bobbin shaft 54 is arranged to be moved in the direction of arrow C by manually operating pin P against the force of compression spring 67. Nevertheless, as will be seen in the following, bobbin shaft 54 and rotary sleeve 58 are operably connected to rotate together during the coil winding operation.

Figure 9:
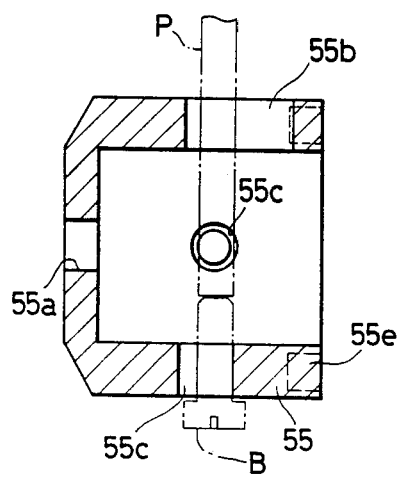
FIG. 9 is a cross-sectional view of a spindle holder utilized in the apparatus of FIG. 2.
Figure 10:
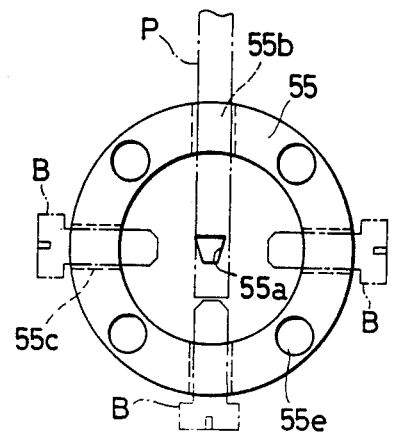
FIG. 10 is a side elevational view of the spindle holder of FIG. 9.

FIGS. 9 and 10 show bobbin spindle holder 55 in more detail and, specifically, bobbin spindle holder 55 has a trapezoidal shaped hole 55a in its end wall into which is inserted the end of bobbin spindle 54. Also formed in spindle holder 55 is a slot 55b and three radial holes 55c in the side walls. Slot 55b and the three holes 55c are equally spaced around cylindrical bobbin spindle holder 55. Additionally, four bores 55e are provided in a surface of spindle holder 55 at the open end thereof and bores 55e are equally spaced around such end surface and are also equally spaced with respect to slot 55b and bores 55c.

Spindle holder 55 is slidingly arranged on an outer surface 58c of rotary sleeve 58 and the exact location of spindle holder 55 around that outer surface 58c can be adjusted by means of three screws, shown typically at B in FIG. 8 and shown in phantom in FIGS. 9 and 10. Adjusting screws B cooperate with springs 68 that are mounted in bores 58e that are formed in rotary sleeve 58. Springs 68 then cooperate between corresponding bore 58e in rotary sleeve 58 and the respective bore 55e formed in the end face of spindle holder 55. Thus, by action of screws B, which clamp onto the surface of rotary sleeve 58, the extent to which bobbin spindle 54 extends through trapezoidal aperture 55a in the end wall of spindle holder 55 can be adjusted. A slot 55b formed in spindle holder 55 is arranged to be at the same location as a similar slot 58b formed in rotary sleeve 58, whereby pin P that is firmly affixed to bobbin spindle 54 can move along in the direction of arrow C of FIG. 8. In this fashion, by manual or machine actuation of pin P, bobbin spindle 54 is retracted and the completed double-layer coil that has been formed according to the present invention can be freely removed.

Figure 11:
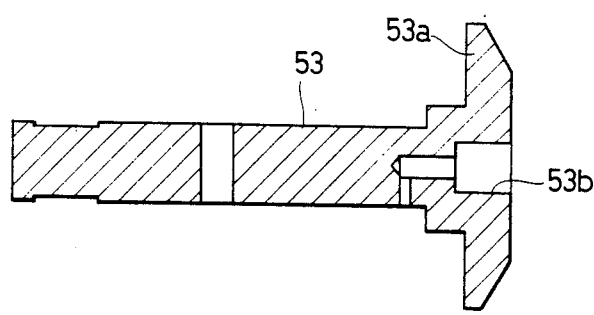
FIG. 11 is a cross-sectional view of a flange element utilized in the apparatus of FIG. 2.

Flange member 53 is shown in cross-sectional detail in FIG. 11, in which it is seen that on the central axis of flange element 53 is formed a bore or cavity 53b to receive the end of bobbin spindle 54. The cavity 53b is provided with an air relief bore or drilling to prevent a vacuum from retaining the spindle 54 and to prevent air pressure from precluding easy insertion of the bobbin spindle 54 into bore 53b.

Figure 12:
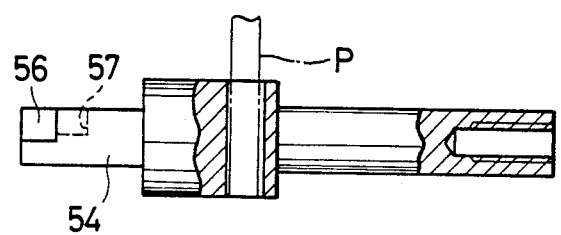
FIG. 12 is a rear elevational view, in partial cross section, of the bobbin spindle utilized in the apparatus of FIG. 2.
Figure 13:
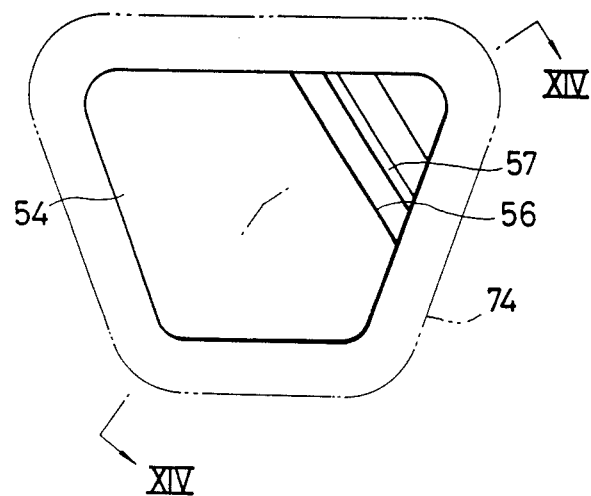
FIG. 13 is a side elevational view of the bobbin spindle of FIG. 12.
Figure 14:
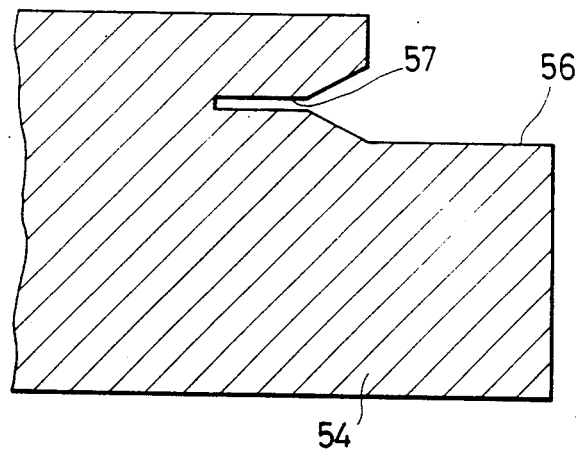
FIG. 14 is an enlarged cross-sectional view taken along section line XIV—XIV in FIG. 13.

The construction of bobbin spindle 54 is shown in more detail in FIGS. 12, 13, and 14 in which it is seen that the free end of bobbin spindle 54 has a relieved edge or cut-away corner 56 at a corner of the trapezoidal end surface thereof. At this relieved or cut-away corner there is formed a notch 57 which serves to grasp the flat conductor 71 used to form the coils at a point along its length determined by the number of turns in each layer of the double-layer coil being formed. Such grasping will be shown in more detail in FIGS. 15a–15e, however, in FIG. 13 one of the coils being formed, that is, a first winding, is shown at the two-dot chain line 74. Additionally, the manner in which pin P is inserted into bobbin shaft 56 is also shown in FIG. 12.

As seen in FIGS. 2 and 8, rotary sleeve 58 is fixed to a rotary disc 59, which is attached to the end of shaft 60. Shaft 60 is rotatably supported by bearings 61 which are affixed in a moveable table 62. Table 62 is caused to be moved in response to operation of hydraulic or pneumatic cylinder 63 by action of piston rod 64. In this way, bobbin spindle 54 is received into or released from the receiving cavity 53b formed in the end of flange element 53 at the center of flange 53a.

Figure 15:
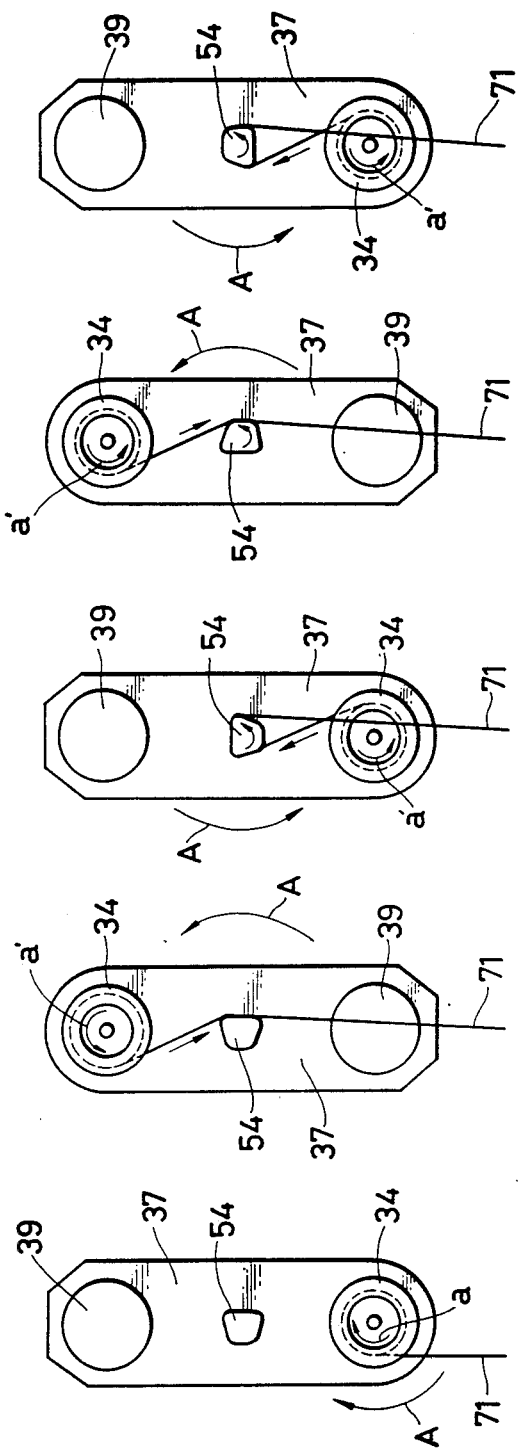
FIGS. 15a–15e are schematic representations illustrating the winding method according to an embodiment of the present invention.

Thus, by means of the embodiment described hereinabove it is possible to form a double-layer coil using flat-conductor wire in accordance with the present invention, and this operation is pictorially demonstrated in FIGS. 15a through 15e. As seen in FIG. 15a, an initial winding operation is performed by using sheave 34 and flat electrical conductor 71, in which cam member 28 shown in FIGS. 6 and 7 is driven upwardly by cylinder 30 so that rotary shaft 23 is moved to the left, in the opposite direction of arrow A of FIG. 2, so that the elements 31 and 32 of the clutch assembly are engaged. At this time, moveable table 12 that has mounted thereon the conductor guide assembly 13 is located by action of air cylinder 14 into the position shown by the solid lines in FIGS. 3 and 4.

At this time it is noted that the operation of the overall assembly, as shown, for example, in FIG. 2, can be accomplished by manual means, that is, by manually energizing motors and pneumatic cylinders in the proper sequence. Nevertheless, in the practical embodiment a suitable control system is provided with the appropriate timing so that the operational events occur for the desired duration and proper sequence. An appropriate timing and control system is not disclosed, because it is not necessary for the understanding of the operation of the present invention and indeed, because the details of the control system form no part of the invention described herein.

Motor 16 is then energized to rotate drive shaft 23 through action of pulleys 17, 21 and belt 20, so that sheave or pulley 34 is caused to rotate in the direction of arrow A by a transmission of force from drive shaft 23 through clutch elements 31,32 and drive shaft 33. Accordingly, as shown in FIG. 15a, flat conductor 71 passing between pairs of rollers 65 and 66 (shown in FIGS. 3 and 4) is wound around rotating pulley 34 in the direction of arrow a. Because the actual length of the coil being formed is known, the time that motor 16 is energized is selected to wind a sufficient amount of conductor 71 onto pulley 34 to form one of the layers of the end-product, double-layer coil. As indicated above, this can be done manually but in practice a control system will time out the operation of motor 16 so that the proper length of conductor 71 is wrapped on sheave 34.

The next operation in the coil winding sequence is to clamp an outer portion of the conductor 71 that has been wound onto sheave 34 by using the end of bobbin spindle 54. This is shown in FIG. 15b in which at this time cam member 28, shown in FIGS. 6 and 7, is moved downward under action of cylinder 30 so that rotary shaft 23 moves to the right under action of spring 26, thereby releasing the clutch assembly by separating element 31 from coupler 32. Once bracket 36 is free of any connection to the rotary shaft 23, motor 47 is energized to begin turning drive shaft 44, thereby turning gears 50 and 51 which cause rotary bracket 38 to rotate. When rotary bracket 38 rotates flyer arm 37 rotates and in FIG. 15b flyer arm 37 is set to be rotated through 180° from its initial at-rest position, as shown in FIG. 15a. Upon such rotation as shown in FIG. 15b of flyer arm 37, a mid-length portion of conductor 71 is now caused to come into contact with the end of bobbin spindle 54 and, specifically, wraps against the relieved edge or cut-away corner 56 of bobbin spindle 54, because at this time pneumatic cylinder 63 has moved the bobbin spindle 54 away from cavity 53b formed in flange element 53. That is, at that point, moveable table 12 that mounts the conductor guide assembly 13 is moved from the solid line position to the dotted line position 12', as shown in FIGS. 3 and 4, therefore, the portion of conductor 71, which is wrapped against the relieved corner 56 of bobbin spindle 54 is easily captured by notch 57 formed at such location in the end of bobbin spindle 54. Once the conductor capturing operation is accomplished, cylinder 63 can be energized to operate piston rod 64 to move sliding table 62 so that bobbin spindle 54 engages cavity 53b of flange element 53, note that it is flange element 53 that is driven and that the bobbin spindle 54 is free to rotate by means of shaft 60 and bearing pair 61.

Figure 16:
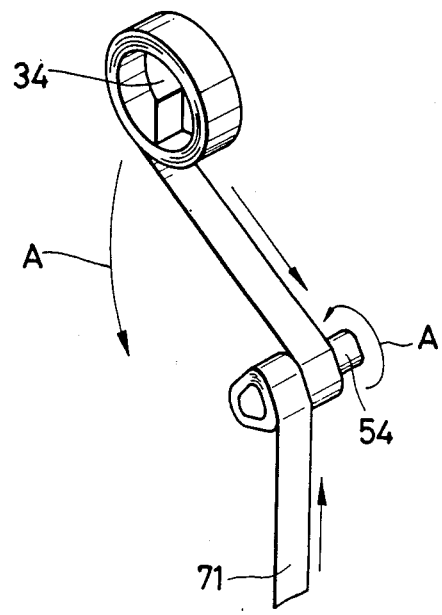
FIG. 16 is a pictorial representation in perspective of the winding method depicted in FIGS. 15a–15e.
Figure 17:
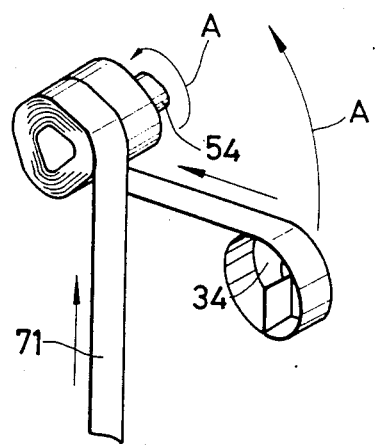
FIG. 17 is a pictorial representation in perspective of the winding method of FIG. 16 at a subsequent stage.

Now that a sufficient amount of conductor 71 to form one of the layers of the double layer coil has been prewound onto pulley 34 and that a mid-portion of the conductor 71 has been captured by the bifurcation 57 of the bobbin spindle 54, the operation in which the actual double-layer coil is wound can be performed. It should be noted in relation to FIGS. 15c through 15e, as well as FIGS. 16 and 17, that each of the double layers of the coil will be wound at the same time. At this time then, bobbin spindle 54 having been engaged in the appropriate bore 53a is caused to be rotated by means of main drive motor 47, with the rotary force being transmitted by way of coupler 46, gears 48 and 49, and drive shaft 41 and flange member 53 that positively mates with the end of bobbin spindle 54. On the other hand, flyer arm 37, which has mounted thereon pulley 34, is then rotated in the opposite direction by means of motor 47 driving coupler 46 through interaction of shaft 44 and gears 50 and 51 and rotary bracket 38.

It will be recalled from the above description that the gear ratios between gears 48 and 49 and between 50 and 51 are so selected that flyer arm 37 will rotate in the same direction as that of bobbin spindle 54 but with a number of revolutions per minute that is twice that of the bobbin spindle 54. In other words, if the number of revolutions of bobbin spindle 54 is selected as R (rpm), then the number of revolutions of pulley 34 in orbit around bobbin spindle 54 will be given by 2R (rpm), this has the result that pulley 34 rotates around bobbin spindle 54 at a relative number of revolutions R (=2R−R). By this action then, the conductor 71 that had been previously wound around pulley 34 is now unwound and at the same time rewound around bobbin spindle 54 to form one layer of the coil. Of course, conductor 71 is also continuously being fed-off through guide assembly 13, so that the conductor is also being wound around bobbin spindle 54 to form another layer of the double-layer coil.

Figure 19:
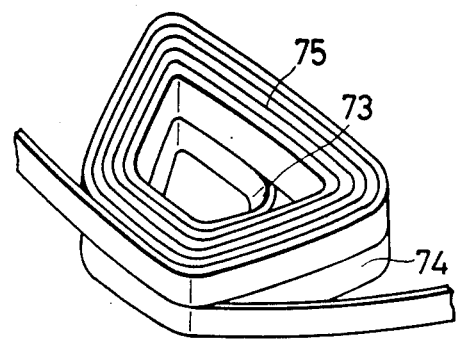
FIG. 19 is a perspective view of the coil of FIG. 18.

During this operation, moving table 12 that has conductor guide assembly 13 mounted thereon is held at the position 12' shown by dotted lines in FIGS. 3 and 4, so that the first layer 74 of the coil that is being rewound from pulley 34 and the second layer of the coil 75, shown in FIG. 19, that is being initially wound through guide assembly 13 are both formed at the same time with no overlapping, that is, the layers of the coil are formed side-by-side in juxtaposition. This formation of the coils in a side-by-side fashion with aligned axes is shown clearly FIGS. 16 and 17.

Once the desired number of turns of the layers has been provided around bobbin spindle 54, motor 47 is stopped from rotating and cylinder 63 operates to pull back moving table 62 in a leftward direction relative to FIG. 2. This movement of moving table 62 then releases bobbin spindle 54 from cavity 53b formed in flange element 53 so that the completely wound double-layer coil is now able to be freely removed from bobbin spindle 54 by pulling or sliding pin P to the left relative to FIG. 2 or to the right relative to FIG. 8, which is a rear view.

Figure 18:
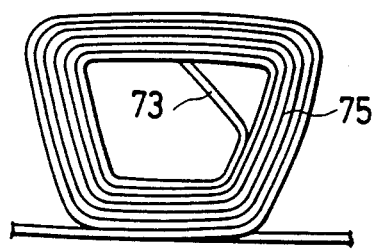
FIG. 18 is a front elevational view of a double-layer coil formed using the method and apparatus according to an embodiment of the present invention.
Figure 20:
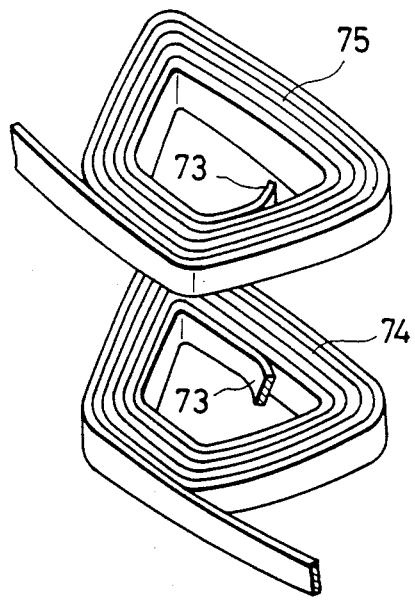
FIG. 20 is a perspective view of the coil of FIGS. 18 and 19 in partially exploded form.

The completed double-layer coil formed of flat conductor 71 is shown in FIGS. 18 through 20, in which the center portion 73 of the resultant coil is shown separated in FIG. 20, so that the two layers 74 and 75 can be shown in an exploded view. This center portion 73 corresponds to that portion of conductor 71 which is clamped at notch 57 of bobbin spindle 54, and because this is the center point and because the two layers 74 and 75 are formed simultaneously, then such layers are of the same size.

Although a bifurcation was formed in the end of bobbin spindle 54 by forming a notch 57 in the cut-away corner 56 of bobbin spindle 54, it will be understood that other modifications of the end of the bobbin spindle can be effected. For example, if a certain amount of tension were to be applied to conductor 71, especially at the point in the operation represented in FIG. 15b, then conductor 71 will be automatically wound around the bobbin spindle without any capturing. In such modification, the bobbin spindle can be engaged with the cavity formed in the flange element at the beginning of the operation with the flyer plate and bobbin spindle commencing rotation at the exact same time.

The above description is provided for a single preferred embodiment of the invention, however, it will be apparent that many modifications and variations could be effected by one skilled in the art without departing from the spirit or scope of the novel concepts of the invention, which should be determined only by the appended claims.

What is claimed is:

1. A method of winding a double-layer coil of a conductor around a bobbin, comprising the steps of:

feeding a continuous conductor to a pulley;

winding a predetermined length of the conductor about the pulley;

arranging the continuous conductor being fed to the pulley adjacent the bobbin at a point along its length;

rotating the bobbin in a first direction at a predetermined rate for winding the conductor thereon starting at said point along the length thereof that is adjacent the bobbin and forming a first layer of the coil around the bobbin; and simultaneously with winding the conductor on the bobbin revolving the pulley having the predetermined length wound thereon around the bobbin in said first direction at a rate two times the rate of rotation of the bobbin, thereby unwinding the conductor from the pulley and winding it around said bobbin to form a second layer of the coil on the bobbin simultaneously with forming the first layer.

2. A method according to claim 1, in which the step of arranging the conductor adjacent the bobbin includes the step of grasping the conductor at said point along the length thereof using a free end of the bobbin.

3. A method according to claim 2, in which said step of grasping the conductor includes forming the end of the bobbin with a bifurcation and engaging the conductor with the bifurcation.

4. A method according to claim 1, comprising the further step following winding of the conductor on the pulley of moving a supply of the continuous conductor, thereby forming the first and second layers immediately adjacent one another.

5. A method according to claim 1, comprising the further step following the winding of the predetermined length of conductor on the pulley of disengaging the pulley from a source of rotary winding force.

6. A method according to claim 5, in which the step of disengaging the pulley comprises operating a cam device to move a drive shaft out of engagement with a corresponding shaft on the pulley.

7. A method according to claim 1, in which the step of rotating the bobbin includes providing a bobbin holder having a non-circular cut-out in an end, forming a free end of the bobbin with a complementary shape, fitting the free end of the bobbin into the cut-out, and rotating the bobbin holder at the predetermined rate.

8. A method according to claim 1, when the step of rotating the bobbin and revolving the pulley are performed using a single drive motor.

* * * * *